United States Patent [19]
Asaka

[11] Patent Number: 5,920,651
[45] Date of Patent: Jul. 6, 1999

[54] COMPRESSED DATA EXPANDING APPARATUS

[75] Inventor: Naohide Asaka, Yokohama, Japan

[73] Assignee: Fujitsu Limited, Kawasaki, Japan

[21] Appl. No.: 08/724,464

[22] Filed: Oct. 1, 1996

[30] Foreign Application Priority Data

Apr. 18, 1996 [JP] Japan .................................. 8-096349

[51] Int. Cl.$^6$ ............................... G06K 9/36; G06K 9/46
[52] U.S. Cl. ........................................... 382/233; 382/232
[58] Field of Search .................................... 382/232, 233; 395/114

[56] References Cited

U.S. PATENT DOCUMENTS 4,807,029   2/1989   Tanaka .................................. 348/400

Primary Examiner—Leo H. Boudreau
Assistant Examiner—Dimitry A. Novik
Attorney, Agent, or Firm—Staas & Halsey

[57] ABSTRACT

A compressed data expanding apparatus for expanding data compressed by predetermined compression rules so as to reconstruct original image data. The data expanding device has an error report function which reports a data error if the number of bits in one line of the expanded data fails to coincide with a designated bit count. The apparatus further includes a controller for carrying out a provisional expansion process and a definitive expansion process. An provisional expansion bit count is determined consecutively within the range from a first lower-limit bit count to a first upper-limit bit count. An expansion instruction regarding one line of the compressed data in a first storage area is sent consecutively to the data expanding device until no error report is returned from the data expanding device. When no further errors are reported, the remainder of the file is expanded using a definitive expansion process which includes an expansion instruction that contains the designated bit count.

12 Claims, 10 Drawing Sheets

COMPRESSED DATA EXPANDING APPARATUS

BACKGROUND OF THE INVENTION

1. Field of the Invention

The present invention relates to a compressed data expanding apparatus adopted in printers and the like, the apparatus expanding image data compressed by predetermined compression rules so as to reconstruct the original image data.

2. Description of the Related Art

Generally, image data (raster data) comprising x bits in the X direction (row direction) and y bits in the Y direction (column direction) in fact have a quantity exceeding the x×y bits. Since image data tend to be huge quantitatively, it is customary to reduce the data amount through compression based on internationally established compression rules so that memories may be used and data transfers carried out more efficiently. Given such compressed data as their input, printers expand (i.e., decompress) the data to reconstruct the original image data before printing. There are various compression rules. A typical compression rule involves consecutively converting image data to the corresponding compression codes on the basis of a compression code table made up of a plurality of compression codes and the bit string data corresponding to these code. At the end of each of the lines constituting the compressed data is an end code indicating the end of the line. Conversely to expand the compressed data involves comparing the data with the compression code table for successive conversion to bit string data.

In general, compressed data does not include size information indicating the original image data size (i.e., X- and Y-direction bit counts). Instead, the size information is usually established as part of additional data furnished independently of the compressed data. The compressed data is expanded by referring to the size information included in the additional date. Because the presence of the additional data is not always guaranteed, there may be cases in which the size of the compressed data to be processed (i.e., printed) is not known in advance.

Despite such unpredictability of the additional data, printing is effected typically by use of the following conventional compressed data expanding apparatus: the apparatus has an external memory in which to store compressed data to be expanded, a microprocessor unit (MPU), and an internal memory that may be accessed by the microprocessor unit. The internal memory accommodates a compression code table in advance. In operation, the microprocessor unit reads the first line of the compressed data, compares the data with the compression code table, converts the compression codes of the data into the corresponding bit string data, and adds up consecutively the number of bits in the bit string data up to the above-mentioned end code so as to find the number of bits in the X direction. The X-direction bit count is used as the basis for expanding all compressed data.

The conventional setup above requires allocating the compression code table, which is referenced only to find the X-direction bit count, in the precious internal memory accessible by the microprocessor unit. The table allocation requirement unit having to utilize a large-capacity internal memory which is generally expensive. This is an obstacle to reducing costs. Another disadvantage is that it takes a long time to compare each of the compression codes in the compressed data with the compression code table, which hampers the effort to improve the speed of processing.

SUMMARY OF THE INVENTION

It is therefore an object of the present invention to provide a low-cost, high-speed compressed data expanding apparatus capable of expanding compressed data having no prior information indicating the size of the original image data.

In accordance with an aspect of the present invention, there is provided a compressed data expanding apparatus for expanding data compressed by predetermined compression rules so as to reconstruct original image data. The compressed data expanding apparatus comprises: a first storing unit for storing the compressed data to be expanded; a second storing unit for storing the expanded image data; a data expanding unit started by an expansion instruction including a designated bit count in order to perform a data expansion process in which the compressed data in the first storing unit is expanded successively and in which the expanded data is written successively as a word defined by predetermined number of bits to the second storing unit, the data expanding means further having an error report function which reports a data error if the number of bits in one line of the expanded data fails to coincide with the designated bit count; and a controlling unit for carrying out a provisional expansion process and a definitive expansion process, the provisional expansion process being a process in which a different designated bit count is determined consecutively within a range defined by a first lower-limit bit count and a first upper-limit bit count and in which an expansion instruction regarding one line of the compressed data in the first storing unit is sent consecutively to the data expanding unit until no error report arrives from the data expanding unit, the definitive expansion process being a process in which the data expanding unit is supplied with an expansion instruction regarding all lines including the designated bit count the moment the data expansion unit has stopped making any error report. Preferably, the controlling unit may determine the designated bit count for use in the provisional expansion process by incrementing the first lower-limit bit count by 1 at a time. Alternatively, the controlling unit may determine the same designated bit count by decrementing the first upper-limit bit count by 1 bit at a time.

According to the present invention, the controlling unit of the invention determines the designated bit count successively to carry out the provisional expansion process on a trial-and-error basis in conjunction with the error report function of the data expanding unit, whereby the X-direction bit count of the reconstructed image data is acquired. With no need to reference a conventional compression code table to find the number of bit in the X direction, the expensive internal memory is not occupied by the extra code table. Because the processing burdens on the controlling unit are alleviated significantly, the speed of the processing is improved.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

First Embodiment

Figure 1:
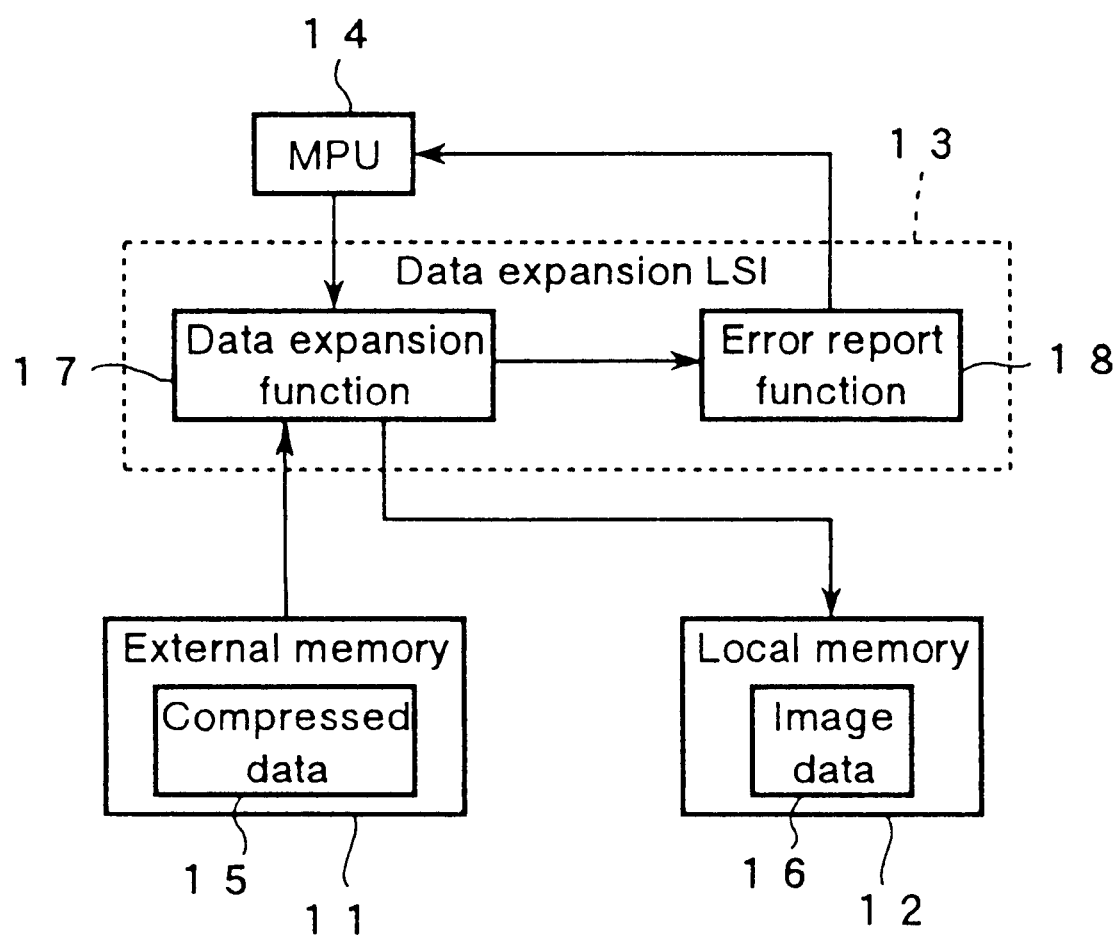
FIG. 1 is a block diagram outlining the constitution of a first embodiment of the invention.
Figure 2:
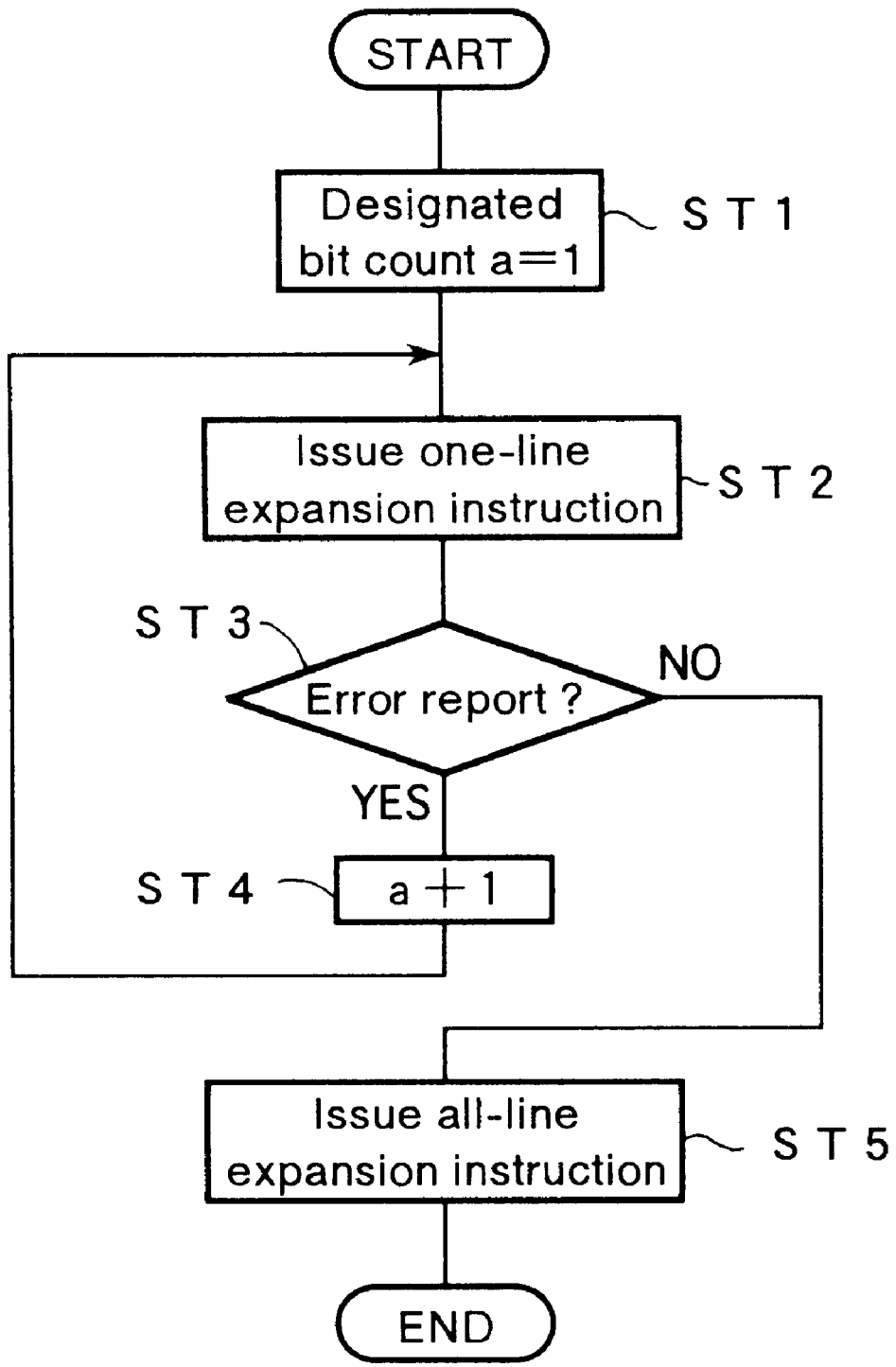
FIG. 2 is a flowchart of steps constituting the processing of a microprocessor unit used by the first embodiment of the invention.
Figure 3:
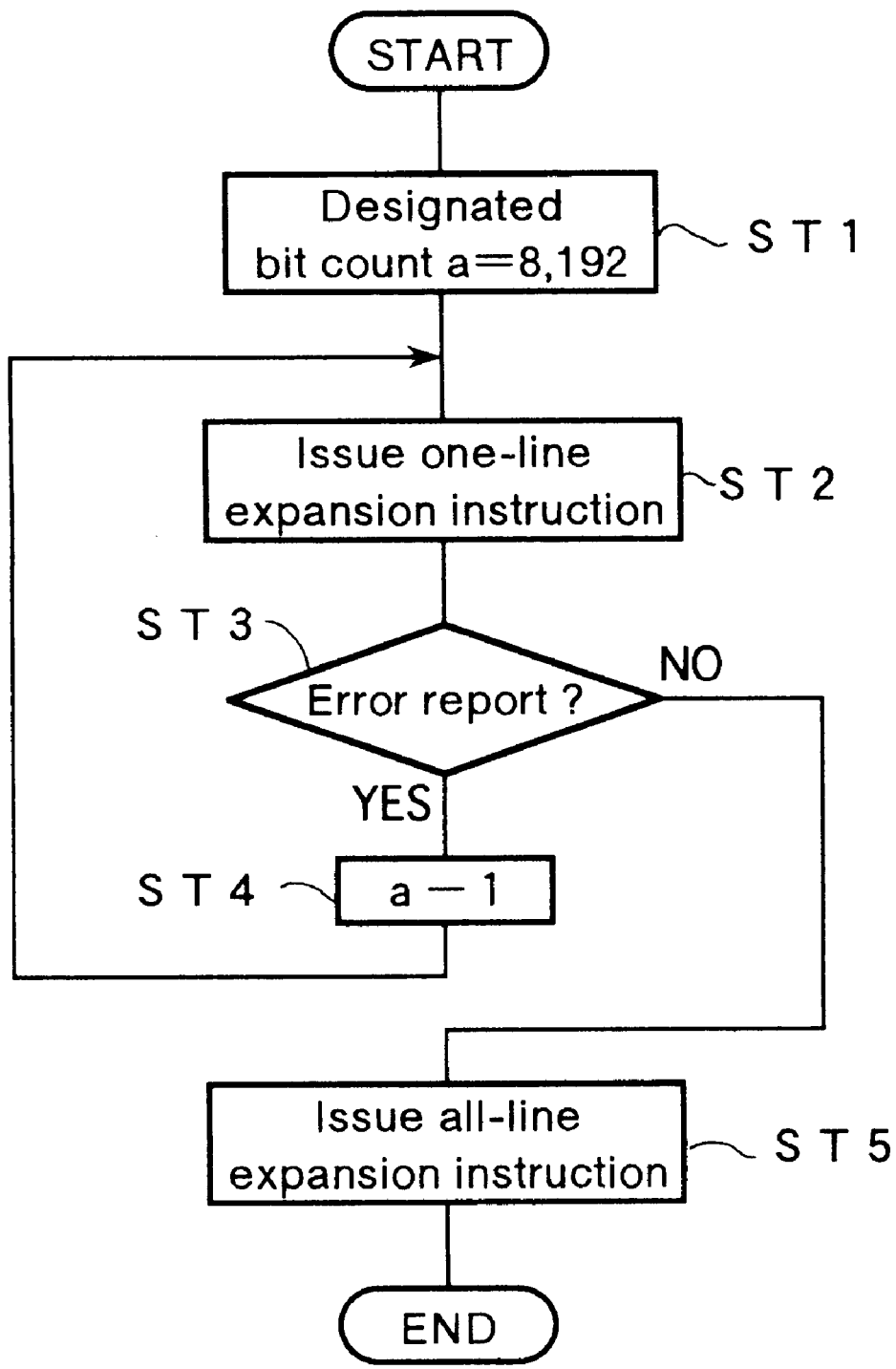
FIG. 3 is a flowchart of alternative steps constituting the processing of the microprocessor unit used by the first embodiment of the invention.

Described below with reference to FIGS. 1 through 3 is a compressed data expanding apparatus practiced as the first embodiment of the invention for use with a printer. The compressed data expanding apparatus shown in FIG. 1 is incorporated in a printer capable of printing image data composed of a minimum of 1 bit and a maximum of 8,192 bits in the X direction of reconstructed image data (raster data). The apparatus works to restore the original image data by expanding the image data compressed according to predetermined compression rules. The compressed image expanding apparatus includes an external memory 11, a local memory 12, a data expansion LSI 13 and a microprocessor unit (MPU) 14.

The external memory 11 stores compressed data 15 to be expanded (i.e., to be printed). The compressed data 15 is obtained by converting the original image data to a plurality of compression codes through the use of a compression code table having the compression codes set in correspondence with bit string data. At the end of each of the lines constituting the compressed data is an end code indicating the end of the line. The local memory 12 serves to accommodate the expanded (i.e., reconstructed) image data 16. The data expansion LSI 13 is started by an expansion instruction containing a designated bit count from the microprocessor unit 14. The data expansion LSI 13 comprises a data expansion function 17 and an error report function 18. The data expansion function 17 expands data constituting one line as well as all lines depending on the expansion instruction from the microprocessor unit 14.

Upon receipt of an expansion instruction from the microprocessor unit 14, the data expansion function 17 of the data expansion LSI 13 reads the compressed data 15 from the external memory 11. By referencing the compression code table comprising the compression rules used for image data compression, the data expansion function 17 converts the compressed codes successively to bit string data. Every 32 bits in the bit string data thus expanded are regarded as one word by the data expansion function 17, which writes the bit string data in units of words to the local memory 12. When the data expansion function 17 detects the end of one line (i.e., when an end code is detected), the error report function 18 of the data expansion LSI 13 compares the designated bit count in the expansion instruction from the microprocessor unit 14 with the number of bits in the actually expanded single line. If there is a mismatch between the two bit counts, the error report function 18 reports a data error to the microprocessor unit 14.

The microprocessor unit 14 performs the steps shown in FIG. 2. Initially, the microprocessor unit 14 carries out a "provisional" expansion process to find an X-direction bit count representing the number of bits in the X direction (line direction) in the expanded image data. Specifically, the microprocessor unit 14 initializes a designated bit count a to 1 that denotes the minimum X-direction bit count (i.e., first lower-limit bit count) that may be handled by the compressed data expanding apparatus (step 1, step is hereinafter referred to as ST). The microprocessor unit 14 then sends a one-line expansion instruction including that designated bit count a to the data expansion LSI 13 (ST 2). The instruction starts the data expansion LSI 13 whose data expansion function 17 carries out expansion of the first line of the compressed data 15. The expanded data is stored consecutively into the local memory 12. The microprocessor unit 14 then checks to see if there is any error report from the error report function 18 of the data expansion LSI 13 (ST 3).

If an error report is found, the microprocessor unit 14 increments the designated bit count a by 1 (ST 4) before returning to ST 2. If no error report is detected, the microprocessor unit 14 establishes the current designated bit count as the X-direction bit count, terminates the provisional expansion process, and carries out a "definitive" expansion process whereby an all-line expansion instruction including the designated bit count a is sent to the data expansion LSI 13 (ST 5). In response, the data expansion LSI 13 expands the compressed data 15 in the external memory 11 starting from the first line, and stores the expanded data into the local memory 12. A print function of the printer, not shown, performs printing using the image data 16 placed in the local memory 12.

The flowchart of FIG. 2 shows that the designated bit count a is initialized to 1 as the minimum X-direction bit count (first lower-limit bit count) processible by the embodiment, and that the designated bit count EL is incremented by 1 at a time to obtain the ultimate designated bit count for use in the expansion of all lines. An alternative to the processing of FIG. 2 is illustrated in FIG. 3. That is, the designated bit count a is initialized to 8,192 as the maximum X-direction bit count (first upper-limit bit count) that may be handled by the embodiment (ST 1 of FIG. 3).

A one-line expansion instruction including the designated bit count a is sent to the data expansion LSI 13 (ST 2). The instruction starts the data expansion LSI 13 whose data expansion function 17 performs expansion of the first line of the compressed data 15. The expanded data is placed consecutively into the local memory 12. The microprocessor unit 14 then checks to see if there is an error report from the error report function 18 of the data expansion LSI 13 (ST 3). If an error report is found, the microprocessor unit 14 decrements the designated bit count a by 1 (ST 4) before returning to ST 2. If no error report is detected, the microprocessor unit 14 establishes the current designated bit count a as the X-direction bit count, terminates the provisional expansion process, and carries out the definitive expansion process whereby an all-line expansion instruction including the designated bit count a is sent to the data expansion LSI 13 (ST 5).

Second Embodiment

Figure 4:
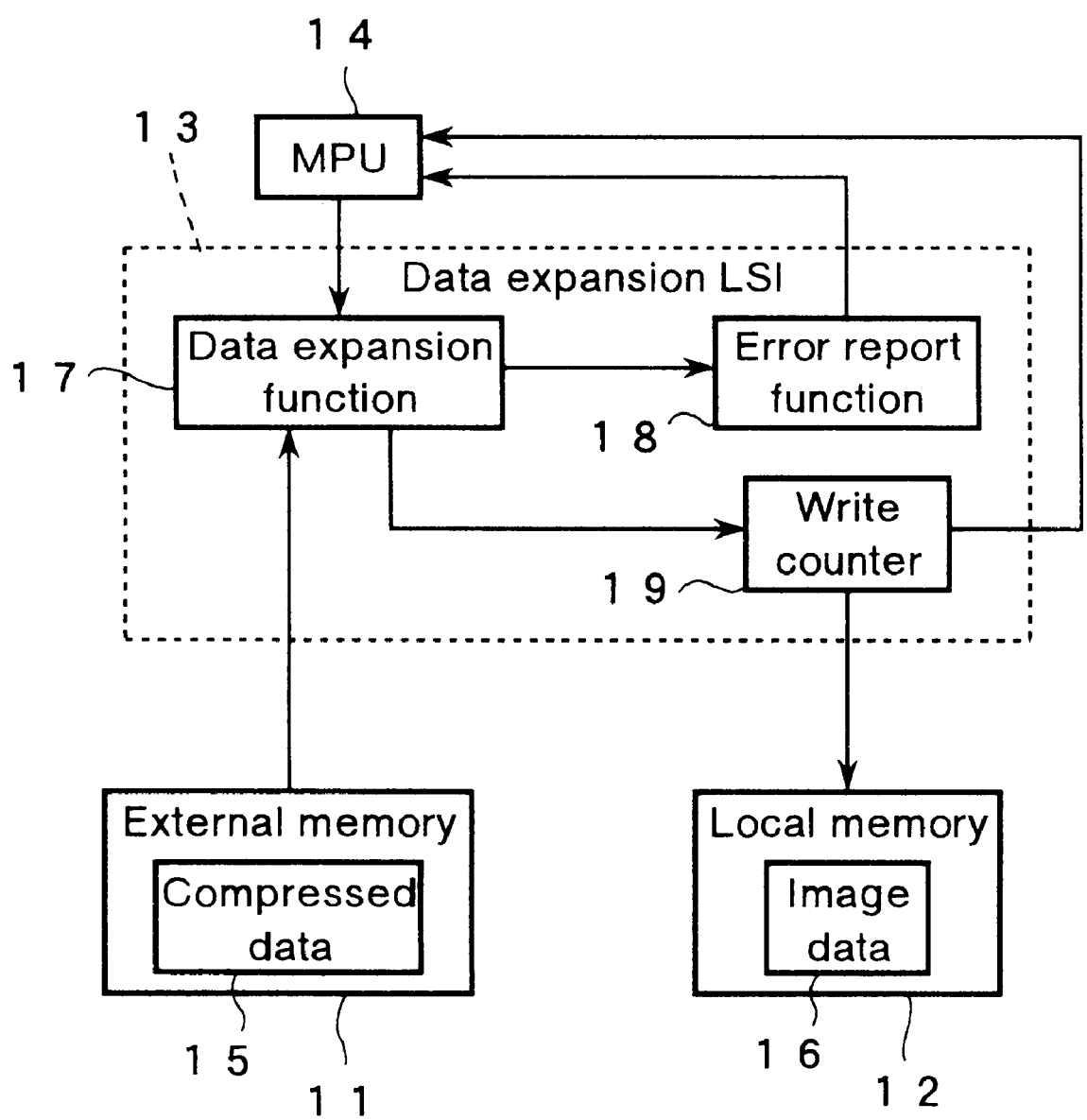
FIG. 4 is a block diagram of a second embodiment of the invention.

Described below with reference to FIG. 4 is a compressed data expanding apparatus practiced as the second embodiment of the invention for use with a printer. The second embodiment is a partial improvement over the first embodiment with a view to implementing a higher processing speed. In FIG. 4, those parts with their counterparts already shown in FIG. 1 are given the same reference numerals, and detailed descriptions of the parts are omitted where they are repetitive.

The data expansion LSI 13 of the second embodiment supplements its corresponding functions in the first embodiment with an additional function: a write counter 19 that counts the number of times (i.e., word count) b data is written to the local memory 12 when one line of the compressed data 15 in the external memory 11 is expanded. The microprocessor unit 14 sets the designated bit count a illustratively to 8,192, the maximum X-direction bit count (i.e., first upper-limit bit count) that may be handled by the embodiment. With the designated bit count a established, the microprocessor unit 14 sends a one-line expansion instruction including the designated bit count a to the data expansion LSI 13. In turn, the data expansion function 17 of the data expansion LSI 13 expands the first line of the compressed data 15 and stores the expanded data into the local memory 12. While the data expansion function 17 is writing bit string data in units of words to the local memory 12, the write count b is counted by the write counter 19.

The microprocessor unit 14 decrements by 1 the write count b counted by the write counter 19, and multiplies the write count b thus decremented by the number of bits c constituting one word (32 bits with the second embodiment) to obtain a second lower-limit bit count d as a working variable. The microprocessor unit 14 also multiplies the write count b by the one-word bit count c to acquire a second upper-limit bit count e as another working variable. Within the range defined by the second lower-limit bit count d and the second upper-limit bit count e, the microprocessor unit 14 determines a different designated bit count a successively. The microprocessor unit 14 then performs the provisional expansion process whereby a one-line expansion instruction including the designated bit count a is sent consecutively to the data expansion LSI 13 until there is no error report coming from the latter. An alternative way to determine a different designated bit count a successively within the range from the second lower-limit bit count d to the second upper-limit bit count e is to regard the second lower-limit bit count d as the initial value and increment that value by 1 successively. Another way is to take the second upper-limit bit count e as the initial value and decrement it by 1 consecutively. With no error report found to arrive from the data expansion LSI 13, the microprocessor unit 14 carries out the definitive expansion process whereby an all-line expansion instruction including the designated bit count a in effect at that point is transmitted to the data expansion LSI 13.

According to the second embodiment, if the write counter 19 of the data expansion LSI 13 illustratively counts 10 as the number of times (word count) b data has been written corresponding to one line, then the target X-direction bit count presumably exists within the range of 289 through 320 bits. This means that the X-direction bit count is obtained by carrying out 33 provisional expansion processes at the most, whereby the speed of processing by the second embodiment is made higher than by the first embodiment.

Third Embodiment

Figure 5:
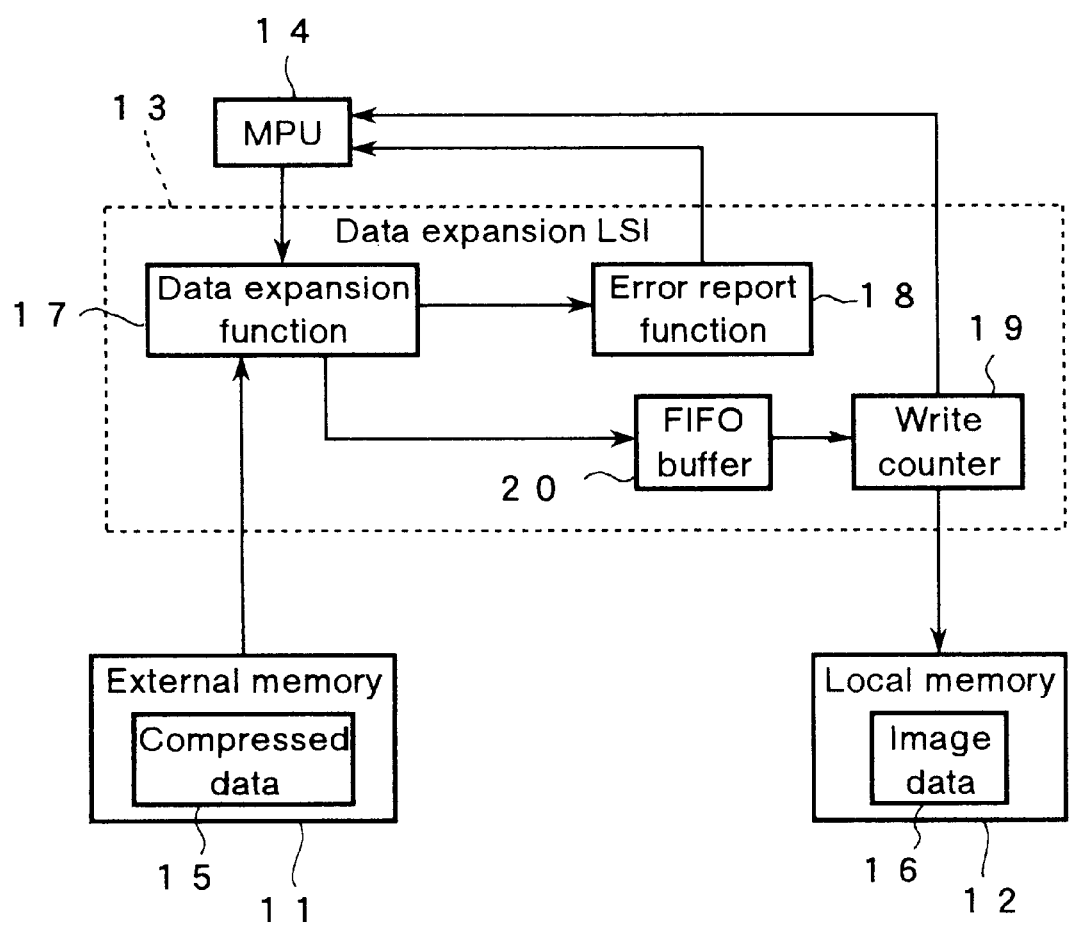
FIG. 5 is a block diagram of a third embodiment of the invention.

Described below with reference to FIG. 5 is a compressed data expanding apparatus practiced as the third embodiment of the invention for use with a printer. The third embodiment is a partial improvement over the second embodiment. In FIG. 5, those parts with their counterparts already shown in FIGS. 1 and 4 are given the same reference numerals, and detailed descriptions of the parts are omitted where they are repetitive.

With the third embodiment, the data expansion LSI 13 has a first-in first-out (FIFO) buffer 20 designed to prevent those delays in processing which are clue to the difference in speed between the processing of the data expansion function 17 and the writing to the local memory 12. Adopting the first-in first-out buffer 20 entails the following problem: at the time the error report function of the data expansion LSI 13 reports a data error to the microprocessor unit 14, there is a possibility that the first-in first-out buffer 20 still contains several words of bit string data. This means that the write count b counted by the write counter 19 may be smaller than the actual count by the number of words left in the first-in first-out buffer 20.

If the second embodiment carries out its processing using the write count (word count) b smaller than the actual word count per line of the compressed data 15, the target X-direction bit count may or may not be found within the range from the second lower-limit bit count d to the second upper-limit bit count e. This deficiency is circumvented by the third embodiment as follows: the microprocessor unit 14 decrements by 1 the write count b counted by the write counter 19, and multiplies the write count b thus decremented by the number of bits c constituting one word (32 bits with the third embodiment) to acquire the second lower-limit bit count d. Within the range from the second lower-limit bit count d to the first upper-limit bit count that is the maximum X-direction bit count (8,192 bits with the third embodiment) treatable by the apparatus, the second lower-limit bit count d is incremented successively by 1 to determine the designated bit count for use in the provisional expansion process. The other aspects of the third embodiment are the same as those of the first and the second embodiments.

Fourth Embodiment

Figure 6:
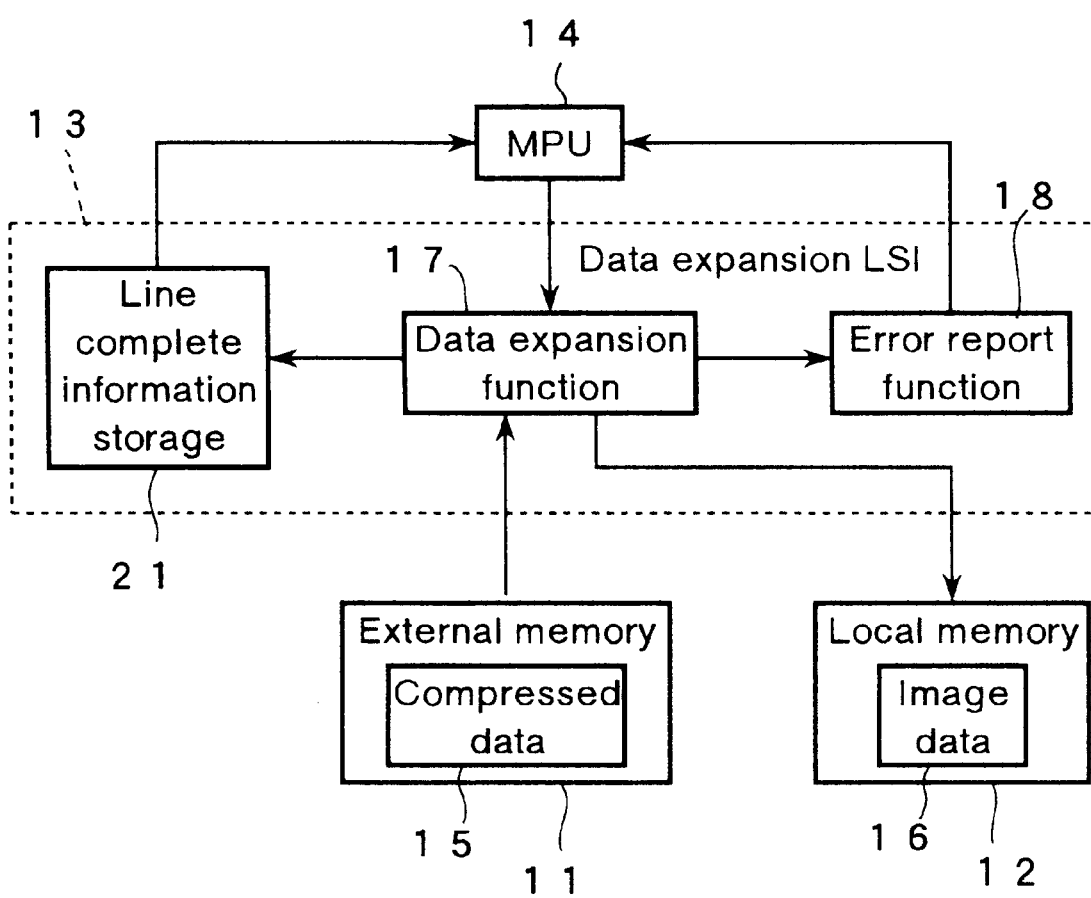
FIG. 6 is a block diagram of a fourth embodiment of the invention.

Described below with reference to FIG. 6 is a compressed data expanding apparatus practiced as the fourth embodiment of the invention for use with a printer. The fourth embodiment is a partial improvement over the first embodiment with a view to achieving a higher processing speed. In FIG. 6, those parts with their counterparts already shown in FIG. 1 are given the same reference numerals, and detailed descriptions of the parts are omitted where they are repetitive.

With the fourth embodiment, the data expansion LSI 13 has a line complete information storage 21 in which is set line complete information indicating that expansion of one line of the compressed data in the external memory 11 has been completed. The microprocessor unit 14 regards 1 bit as the second lower-limit bit count d that is the minimum X-direction bit count (first lower-limit bit count) treatable by the embodiment, and takes 8,192 bits as the second upper-limit bit count e that is the maximum X-direction bit count (first upper-limit bit count) processible by the embodiment. The microprocessor unit 14 then performs a first designated bit count determining process whereby the number of bits constituting half the range from the second lower-limit bit count d to the second upper-limit bit count e is regarded as the designated bit count a. With the first designated bit count determining process carried out, the microprocessor unit 14 references the line complete information storage 21 upon receipt of an error report from the data expansion LSI 13.

If the line complete information is found to be set in the line complete information storage 21, the microprocessor unit 14 conducts the above-mentioned first designated bit count determining process by regarding the designated bit count a as the second upper-limit bit count e. If the line complete information is not set, the microprocessor unit 14 carries out a second designated bit count determining process whereby the first designated bit count determined process is performed on the assumption that the designated bit count a is the second lower-limit bit count d. The microprocessor unit 14 determines the designated bit count for use in the provisional expansion process by repeating the second designated bit count determining process in the manner above until there is no error report coming from the data expansion LSI 13. More specifically, the initial designated bit count of the provisional expansion process is 4,096 because the first lower-limit bit count is 1 and the first upper-limit bit count is 8,192. A one-line expansion instruction comprising the designated bit count above is sent to the data expansion LSI 13. If the desired X-direction bit count is not 4,096, there is an error report. In that case, a check is made to see if the line complete information storage 21 has line complete information set therein.

If the line complete information is found to be set in the line complete information storage 21, the desired X-direction bit count is smaller than 4,096; if the line complete information is not set, the target X-direction bit count is greater than 4,096. This means that the designated bit count for the second time in the provisional expansion process is 2,048 if the line complete information exists, or 6,144 if there is no line complete information. When the designated bit count a is determined successively in like manner, the definitive X-direction bit count will be established within 13 iterations. Where the first upper-limit bit count is $2^n$, the X-direction bit count is established within n iterations. The fourth embodiment implemented in the manner above offers a higher processing speed than the first embodiment.

Fifth Embodiment

Figure 7:
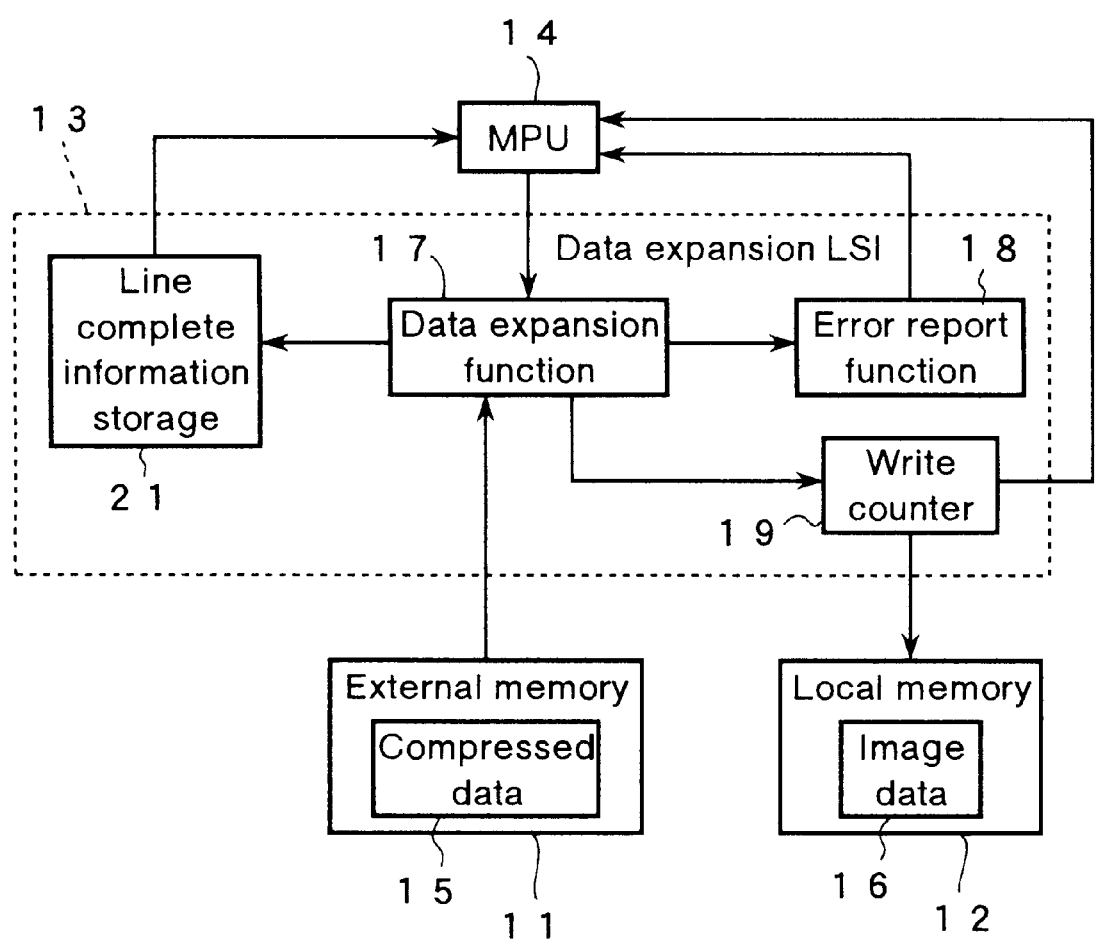
FIG. 7 is a block diagram of a fifth embodiment of the invention.

Described below with reference to FIG. 7 is a compressed data expanding apparatus practiced as the fifth embodiment of the invention for use with a printer. The fifth embodiment is an attempt to achieve a higher processing speed by combining the fourth embodiment with the second embodiment. In FIG. 7, those parts with their counterparts already shown in FIGS. 4 and 6 are given the same reference numerals, and detailed descriptions of the parts are omitted where they are repetitive.

With the second embodiment, as described, the microprocessor unit 14 obtains the write count (word count) b regarding the first line of the compressed data 15, decrements the write count b by 1, and multiplies the write count b thus decremented by the number of bits constituting one word (32 bits with the second embodiment) to acquire the second lower-limit bit count d. The write count b is also multiplied by the one-word bit count c to provide the second upper-limit bit count e. Within the range defined by the second lower-limit bit count d and the second upper-limit bit count e, a different designated bit count is consecutively determined. With the fifth embodiment, by contrast, the designated bit count is successively determined within the range from the second lower-limit bit count d to the second upper-limit bit count e in the manner in which the fourth embodiment operates. That is, the first designated bit count determining process is performed in order to regard as the designated bit count a the number of bits constituting half the range from the second lower-limit bit count d to the second upper-limit bit count e.

If the line complete information is found to be set in the line complete information storage 21, the microprocessor unit 14 conducts the first designated bit count determining process by regarding the designated bit count a as the second upper-limit bit count e. If the line complete information is not set, the microprocessor unit 14 carries out the second designated bit count determining process whereby the first designated bit count determined process is performed on the assumption that the designated bit count a is the second lower-limit bit count d. The microprocessor unit 14 determines the designated bit count for use in the provisional expansion process by repeating the second designated bit count determining process in like manner until there is no error report coming from the data expansion LSI 13.

Where the one-word bit count is illustratively 32 as with the fifth embodiment, the desired X-direction bit count is established within five iterations. This allows the fifth embodiment to provide a further reduction in the processing time than the second embodiment.

Sixth Embodiment

Figure 8:
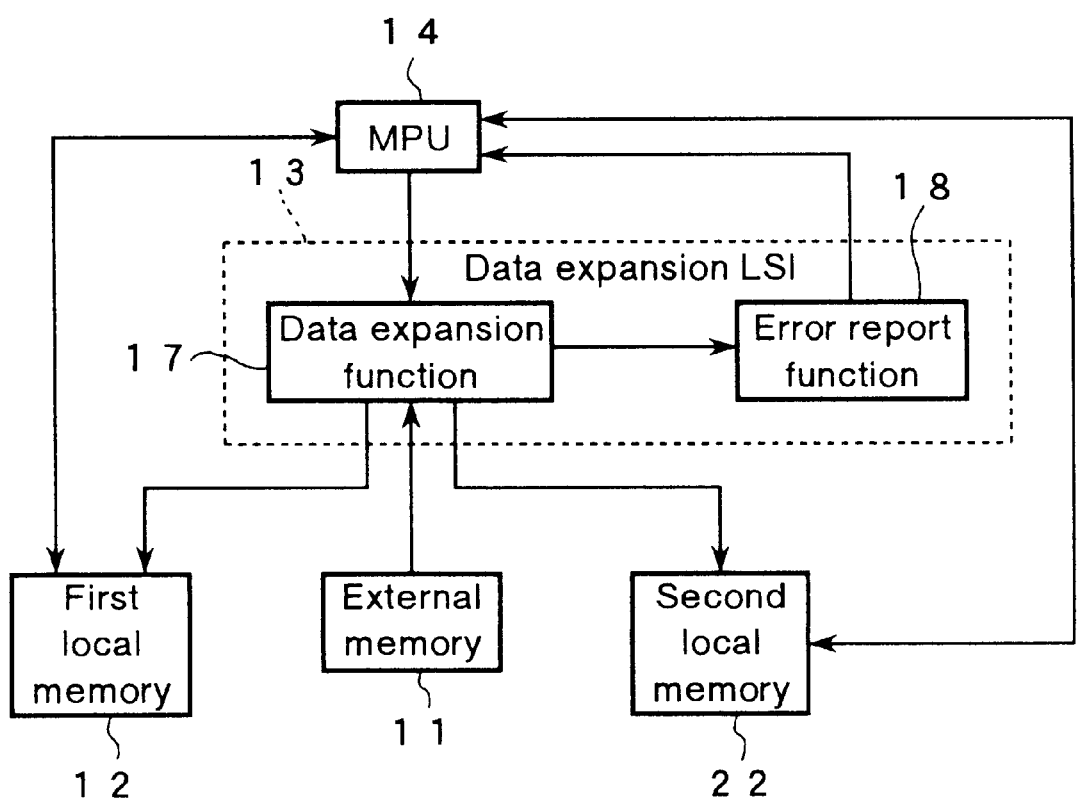
FIG. 8 is a block diagram of a sixth embodiment of the invention.
Figure 9:
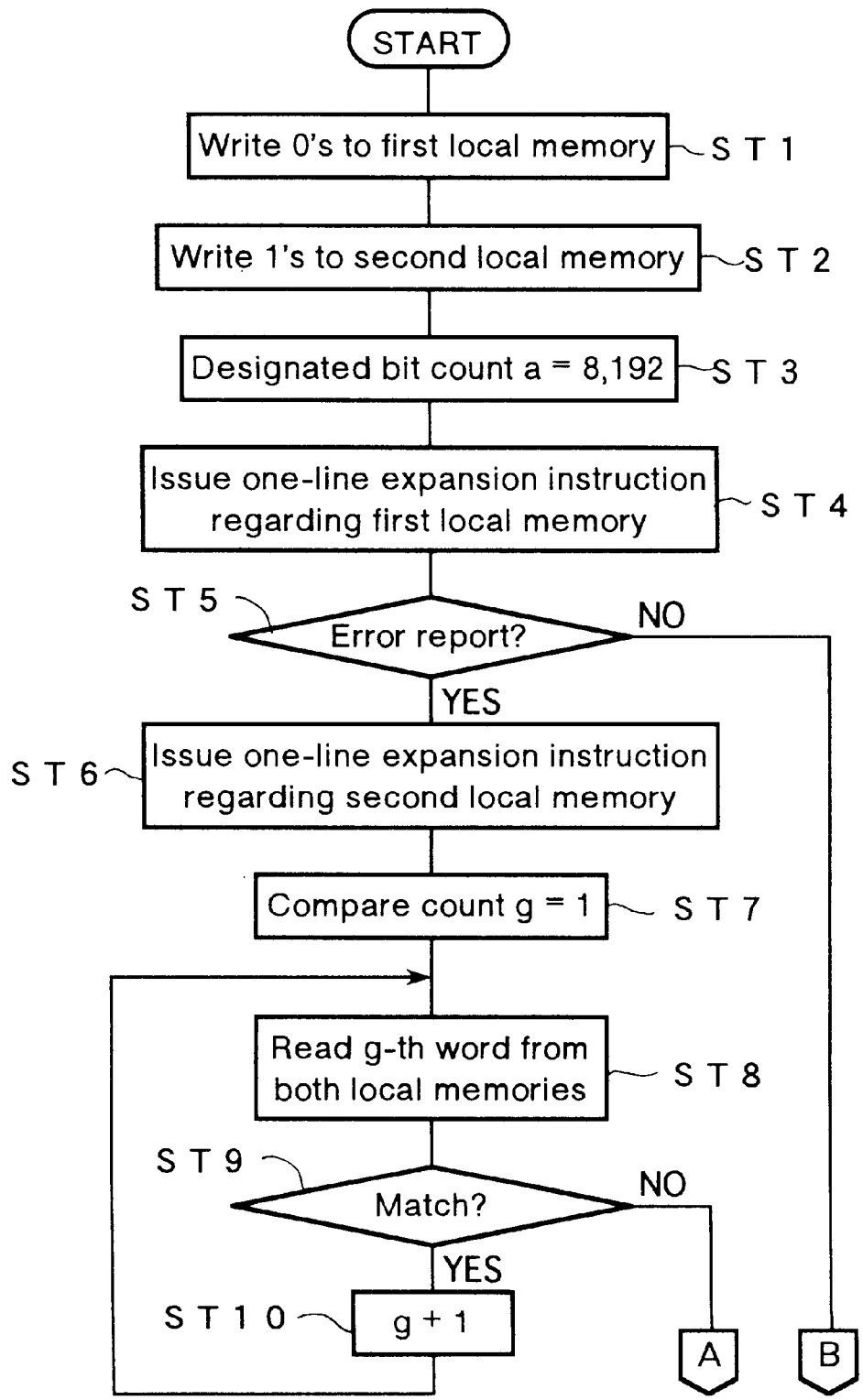
FIG. 9 is a flowchart of steps constituting the first half of the processing of a microprocessor unit used by the sixth embodiment of the invention.
Figure 10:
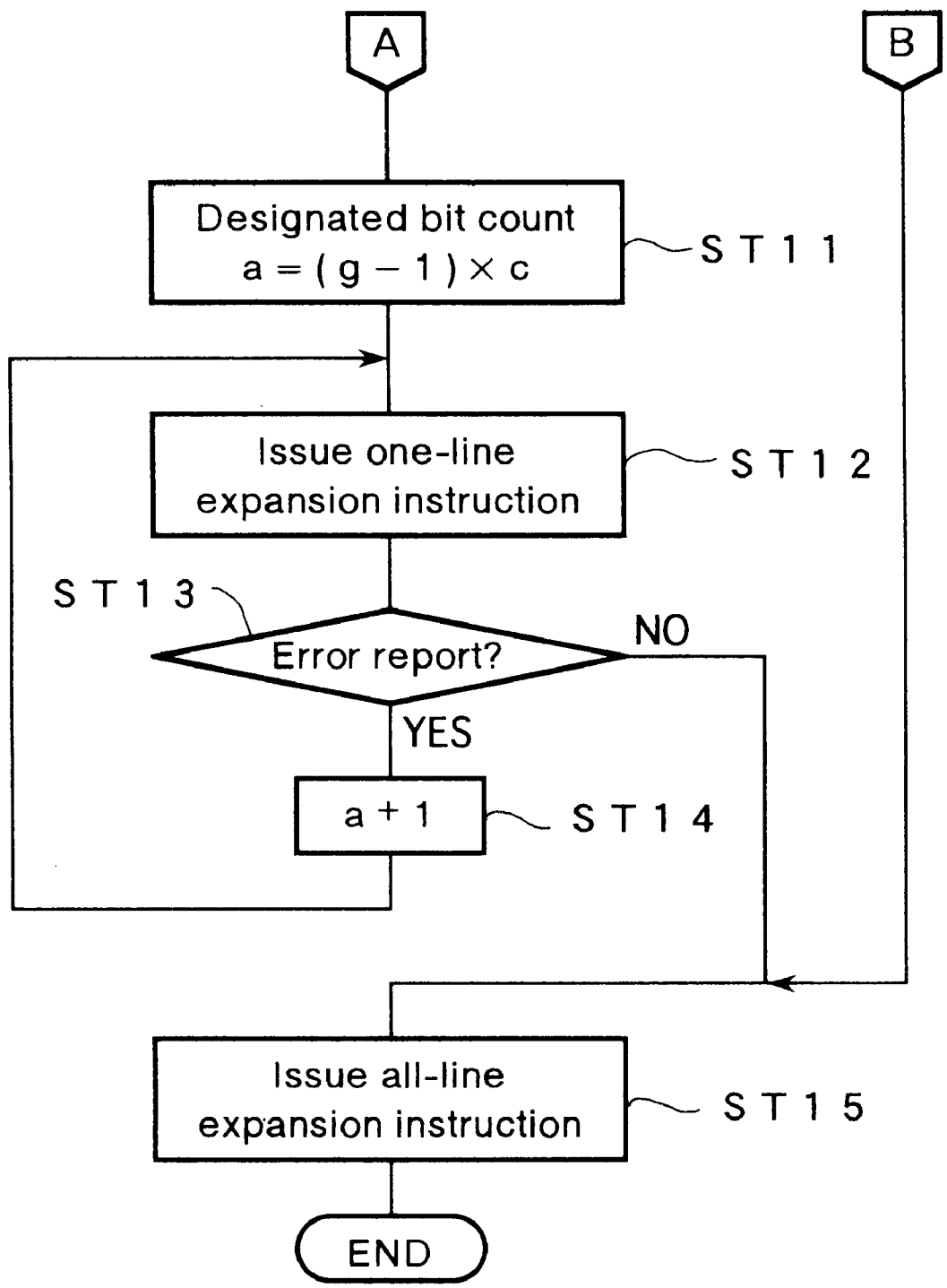
FIG. 10 is a flowchart of steps constituting the second half of the processing of the microprocessor unit used by the sixth embodiment of the invention.

Described below with reference to FIGS. 8 through 10 is a compressed data expanding apparatus practiced as the sixth embodiment of the invention for use with a printer. The sixth embodiment is a partial improvement over the first embodiment with a view to offering a higher processing speed. In FIG. 8, those parts with their counterparts already shown in FIG. 1 are given the same reference numerals, and detailed descriptions of the parts are omitted where they are repetitive.

The sixth embodiment in the form of the compressed data expanding apparatus includes a second local memory 22 in addition to the local memory 12 (called the first local memory hereunder). The data expansion function 17 of the data expansion LSI 13 writes data selectively either to the first local memory 12 or to the second local memory 22 depending on the instruction from the microprocessor unit 14. The microprocessor unit 14 of the sixth embodiment performs the steps shown in FIGS. 9 and 10. Initially, the microprocessor unit 14 writes bit data 0 to the entire first local memory 12 (ST 1), and bit data 1 to the entire second local memory 22 (ST 2). It should be noted that the two memories are initialized using different bit data.

The microprocessor unit 14 then sets the designated bit count a to 8,192 as the maximum X-direction bit count (first upper-limit bit count) that may be handled by the embodiment (ST 3). A one-line expansion instruction including the designated bit count a is sent to the data expansion LSI 13 (ST 4). The instruction causes the data expansion function 17 to expand the first line of the compressed data 15. The expanded data is stored consecutively into the first local memory 12. The microprocessor unit 14 then checks to see if there is an error report coming from the error report function 18 of the data expansion LSI 13 (ST 5). If an error report is detected, the microprocessor unit 14 supplies the data expansion LSI 13 with a one-line expansion instruction including the designated bit count a regarding the second local memory 22 (ST 6). The instruction causes the data expansion function 17 to expand the first line of the compressed data 15. The expanded data is stored successively into the second local memory 22.

The microprocessor unit 14 initializes a compare count g to 1 as a working variable (ST 7). With the compare count g initialized, the microprocessor unit 14 reads the g-th word from both the first local memory 12 and the second local memory 22 (ST 8). With the two words retrieved, a check is made to see if there is a match therebetween (ST 9). If the g-th word from the first local memory 12 coincides with the g-th word from the second local memory 22 in ST 9, the microprocessor unit 14 increments the compare count g by 1 (ST 10) before returning to ST 8. If the two g-th words fail to match in ST 9, ST 11 of FIG. 10 is reached. At this point, the compare count g is equal to the word count of the first line in the compressed data 15. Therefore the microprocessor unit 14 decrements the word count g by 1, multiples the word count g thus decremented by the one-word bit count (32 bits with the sixth embodiment) to find the designated bit count a (ST 11), and sends to the data expansion LSI 13 a one-line expansion instruction including the designated bit count a thus obtained (ST 12). The instruction causes the data expansion function 17 to expand the first line of the compressed data 15. The compressed data is stored successively into the first local memory 12. The microprocessor unit 14 then checks to see if there is an error report coming from the error report function 18 of the data expansion LSI 13 (ST 13). If an error report is detected, the microprocessor unit 14 increments the designated bit count g by 1 (ST 14) before returning to ST 12. If no error report is detected, the microprocessor unit 14 regards the designated bit count g in effect at that point as the X-direction bit count, terminates the provisional expansion process, and performs the definitive expansion process in which the data expansion LSI 13 is supplied with an all-line expansion instruction including the designated bit count a (ST 15).

If no error report is detected in ST 5 of FIG. 9, the microprocessor unit 14 also regards the designated bit count g in effect at that point as the X-direction bit count, terminates the provisional expansion process, and performs the definitive expansion process in which the data expansion LSI 13 is fed with an all-line expansion instruction including the designated bit count a (ST 15). Given the all-line expansion instruction, the data expansion LSI 13 expands successively the compressed data 15 in the external memory 11 starting from the first line. The expanded data is placed into the first local memory 12. A print function of the printer, not shown, performs printing using the image data held in the local memory 12. In ST 11, as described, the word count g decremented by 1 is multiplied by the one-word bit count c to yield the designated bit count a. With an error report detected, the designated bit count a is incremented by 1 in ST 14. Alternatively, in ST 11, the word count g may be multiplied by the one-word bit count c to acquire the designated bit count a. In the event that an error report is present, the designated bit count a may be decremented by 1 in ST 14.

According to the sixth embodiment, if the word count g per line obtained by the microprocessor unit 14 is, say, 10, then the desired X-direction bit count presumably exists within the range of 289 through 320 bits. This means that the X-direction bit count is acquired by performing 33 provisional expansion processes at the most. This allows the sixth embodiment to offer a higher speed of processing than the first embodiment.

While preferred embodiments of the invention have been described using specific terms, such description is for illustrative purposes only, and it is to be understood that changes and variations may be made without departing from the spirit and scope of the following claims.

What is claimed is:

1. A compressed data expanding apparatus for expanding data compressed by predetermined compression rules so as to reconstruct original image data, said compressed data expanding apparatus comprising:

a first storing means for storing the compressed data to be expanded;

a second storing means for storing the expanded image data;

a data expanding means started by an expansion instruction including a designated bit count in order to perform a data expansion process in which said compressed data in said first storing means is expanded successively and in which the expanded data is written successively as a word defined by predetermined number of bits to said second storing means, said data expanding means further having an error report function which reports a data error if the number of bits in one line of the expanded data fails to coincide with said designated bit count; and a controlling means for carrying out a provisional expansion process and a definitive expansion process, said provisional expansion process being a process in which a different designated bit count is determined consecutively within the range defined by a first lower-limit bit count and a first upper-limit bit count and in which a one-line expansion instruction of said compressed data in said first storing means is sent consecutively to said data expanding means until no error report arrives from said data expanding means, said definitive expansion process being a process in which said data expanding means is supplied with an all-line expansion instruction including the designated bit count the moment said data expansion means has stopped making any error report.

2. A compressed data expanding apparatus according to claim 1, wherein said controlling means determines the designated bit count for use in said provisional expansion process by incrementing said first lower-limit bit count by 1 bit at a time.

3. A compressed data expanding apparatus according to claim 1, wherein said controlling means determines the designated bit count for use in said provisional expansion process by decrementing said first upper-limit bit count by 1 bit at a time.

4. A compressed data expanding apparatus according to claim 1, wherein said data expanding means includes a write counting function used when one line of said compressed data in said first storing means is expanded, said write counting means thereupon counting the number of times the expanded data is written to said second storing means; and said controlling means decrements by 1 the write count counted by said write counting function, multiplies the decremented write count by the number of bits per word to acquire a second lower-limit bit count, multiples said write count by the one-word bit count to obtain a second upper-limit bit count, and determines the designated bit count for use in said provisional expansion process within the range from said second lower-limit bit count to said second upper-limit bit count.

5. A compressed data expanding apparatus according to claim 4, wherein said controlling means determines the designated bit count for use in said provisional expansion process by incrementing said second lower-limit bit count by 1 bit at a time.

6. A compressed data expanding apparatus according to claim 4, wherein said controlling means determines the designated bit count for use in said provisional expansion process by decrementing said second upper-limit bit count by 1 bit at a time.

7. A compressed data expanding apparatus according to claim 1, wherein said data expanding means includes a write counting function used when one line of said compressed data in said first storing means is expanded, said write counting means thereupon counting the number of times the expanded data is written to said second storing means; and said controlling means decrements by 1 the write count counted by said write counting function, multiplies the decremented write count by the number of bits per word to acquire a second lower-limit bit count, and determines the designated bit count for use in said provisional expansion process by incrementing said second lower-limit bit count by 1 at a time within the range from said second lower-limit bit count to said first upper-limit bit count.

8. A compressed data expanding apparatus according to claim 1, wherein said data expanding means has a line complete information storage used when the expansion of one line of said compressed data in said first storing means has been completed, said complete information storage thereupon having line complete information set therein indicating the completion of the one-line expansion; and said controlling means regards said first lower-limit bit count as a second lower-limit bit count and said first upper-limit bit count as a second upper-limit bit count;

said controlling means further performing a first designated bit count determining process in which the number of bits constituting half the range from said second lower-limit bit count to said second upper-limit bit count is regarded as the designated bit count;

said controlling means further performing a second designated bit count determining process upon receipt of an error report from said data expanding means, said second designated bit count determining process being a process in which said first designated bit count determining process is carried out with said second upper-limit bit count regarded as said designated bit count if said line complete information is found to be set in said line complete information storage upon reference thereto, and in which said first designated bit count determining process is conducted with said second lower-limit bit count regarded as said designated bit count if said line complete information is not found to be set in said line complete information storage;

said controlling means further repeating successively said second designated bit count determining process until there is no error report coming from said data expanding means, thereby determining the designated bit count for use in said provisional expansion process.

9. A compressed data expanding apparatus according to claim 1, wherein said data expanding means includes a write counting function used when one line of said compressed data in said first storing means is expanded, said write counting means thereupon counting the number of times the expanded data is written to said second storing means, said data expanding means further including a line complete information storage used when the expansion of one line of said compressed data in said first storing means has been completed, said complete information storage thereupon having line complete information set therein indicating the completion of the one-line expansion; and said controlling means decrements by 1 the write count counted by said write counting function of said data expanding means, multiplies the decremented write count by the number of bits per word to acquire a second lower-limit bit count, multiples said write count by the one-word bit count to obtain a second upper-limit bit count;

said controlling means further performing a first designated bit count determining process in which the number of bits constituting half the range from said second lower-limit bit count to said second upper-limit bit count is regarded as the designated bit count;

said controlling means further performing a second designated bit count determining process upon receipt of an error report from said data expanding means, said second designated bit count determining process being a process in which said first designated bit count determining process is carried out with said second upper-limit bit count regarded as said designated bit count if said line complete information is found to be set in said line complete information storage upon reference thereto, and in which said first designated bit count determining process is conducted with said second lower-limit bit count regarded as said designated bit count if said line complete information is not found to be set in said line complete information storage;

said controlling means further repeating successively said second designated bit count determining process until there is no error report coming from said data expanding means, thereby determining the designated bit count for use in said provisional expansion process.

10. A compressed data expanding apparatus according to claim 1, further comprising third storing means in which to store expanded image data independent of said second storing means;

said second storing means having first predetermined bit data written integrally thereto in advance;

said third storing means having second predetermined bit data written integrally thereto in advance, said second predetermined bit data being different from said first predetermined bit data; and wherein said controlling means designates said second storing means as the destination to which to write said expanded image data, and supplies said data expanding means with a one-line expansion instruction regarding one line of said compressed data in said first storing means;

said controlling means further designating said third storing means as the destination to which to write said expanded image data, and supplies said data expanding means with a one-line expansion instruction regarding one line of said compressed data in said first storing means;

said controlling means further comparing the contents of said second storing means with those of said third storing means successively in units of words in order to find the number of words in the first line of said compressed data in said first storing means;

said controlling means further decrementing by 1 the word count thus obtained, multiplying the decremented word count by the number of bits per word to acquire a second lower-limit bit count, multiplying said word count by the one-word bit count to find a second upper-limit bit count, and determining the designated bit count for use in said provisional expansion process within the range from said second lower-limit bit count to said second upper-limit bit count.

11. A compressed data expanding apparatus according to claim 10, wherein said controlling means determines the designated bit count for use in said provisional expansion process by incrementing said second lower-limit bit count by 1 bit at a time.

12. A compressed data expanding apparatus according to claim 10, wherein said controlling means determines the designated bit count for use in said provisional expansion process by decrementing said second upper-limit bit count by 1 bit at a time.

* * * * *